(9.)
AARON F. DICKEY.
Improvement in Bee Hives.
No. 121,597. Patented Dec. 5, 1871.
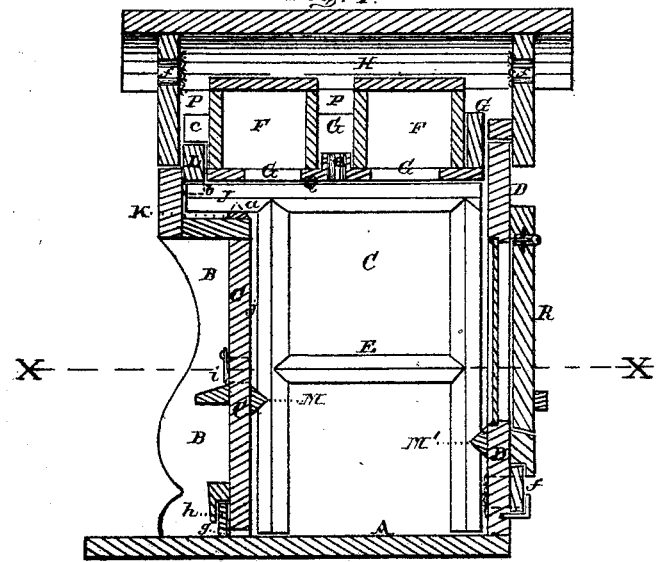
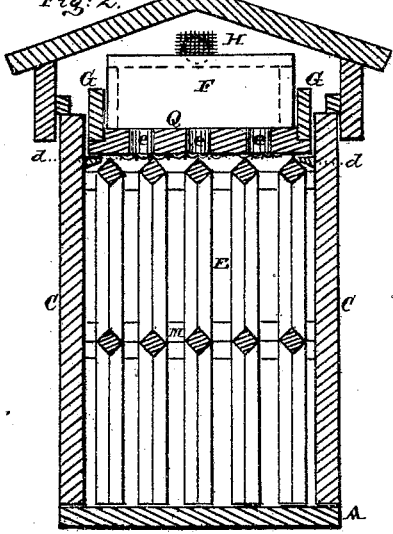
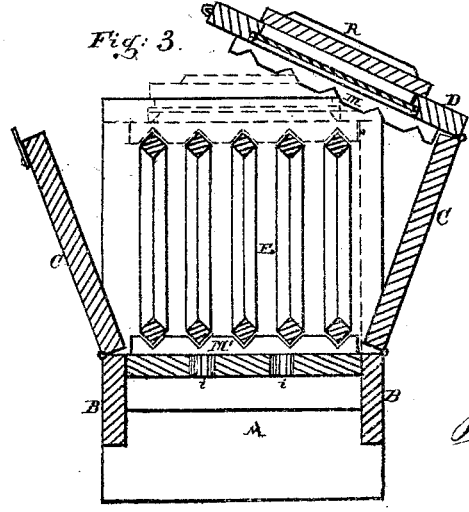
Witnesses:
Inventor:
Aaron F. Dickey
by
Johnson Klaucke & Co
his Attorneys

UNITED STATES PATENT OFFICE.

AARON F. DICKEY, OF BENFORD'S STORE, PENNSYLVANIA.

IMPROVEMENT IN BEE-HIVES.

Specification forming part of Letters Patent No. 121,597, dated December 5, 1871.

*To all whom it may concern:*

Be it known that I, AARON F. DICKEY, of Benford's Store, in the county of Somerset and State of Pennsylvania, have invented certain new and useful Improvements in Bee-Hives, of which the following is a specification:

In the accompanying drawing, Figure 1 represents a vertical section of a hive embracing my invention. Fig. 2 represents a similar section at right angles to that of Fig. 1, and Fig. 3 a horizontal section taken at the line $x\ x$ of Fig. 1.

The frame consists of a base-board, A, and two upright front side pieces, B B, united together at their upper ends so as to form a front top extension or enlargement for two purposes to be presently described. The sides C of the box are hinged to the front supports B, and the rear side D to one of the sides C, so that the three sides can be opened to expose the whole of comb-sash E, as shown in Fig. 3, without in the least disturbing the sash which are suspended within the chamber of the hive. The surplus honey-boxes F are arranged within a removable frame, G, above the comb-sash, and covered by a ventilating-cap, H, supported upon the front and hinged sides of the frame. The comb-sash E are suspended in vertical position parallel to each other, by having an arm, J, of their top bars rest upon the upper inner bar K of the front side, and extend forward beneath the upper front bar L of the sides B, so as to hold and brace each one in position without fastening, and allow it to be readily withdrawn and replaced by simply inserting its arm J within its notched seats $a\ b$ in the bars K and L outside of the sash-chamber, as shown in Fig. 1. The bars of the sash are square in their cross-section, and arranged so as to present acute angles both inward and outward, which has the double advantage of an inward comb-guide, and avoid outward square faces which might form openings for moth harbors. The seats $a$ and $b$ in the bars K and L are, therefore, made V-shaped to hold the sash apart at their upper ends; while their vertical bars rest in V-shaped notches formed on cleats M M' secured to the inner sides of the front and hinged back of the hive, and thus hold them firmly in their suspended position. The removable frame G of the surplus honey-boxes is arranged to fit within the chamber formed by the front extension of the main frame, and it is supported upon the top bar L thereof by the projections $c$, shown in Fig. 1, and at its rear end by cleats or pins $d$ on the inner sides of the side doors, as shown in Fig. 2. Two or more surplus honey-boxes, F, are arranged within this frame, so that while one is directly over the sash-chamber the other is located partially within the upper extension of the frame, thus utilizing the said front extended space to obtain larger surplus boxes and admit of a ventilating-space, P, between them, the openings $e$ for which are formed in a cross-bar, Q, and covered with gauze, thereby obtaining a central ventilation; while ventilating-holes $f$ are also arranged near the bottom in the back door and at the ends of the cover H, and, as the comb-sash is open on all sides, allows the heat to pass unobstructed to the honey-boxes, which is very essential in comb-building, as it requires a certain temperature before the comb will readily adhere to the wood.

The bees enter the comb-sash chamber through openings $g$ at the bottom of the front side, which are provided with slides $h$ to regulate or close the same. In order, however, to lessen the travel of the bees to the surplus honey-chamber other openings $i$ are made in the front side just above the inner supporting-cleat M', so that, when the sash are filled, the bees will enter the upper openings $i$ and pass up the space $j$ between the sash and inner side of the front, and thus give the advantage of a short route to the surplus boxes above. These upper openings $i$ are also provided with covers. The back of the hive is provided with a window, R, to examine the sash-combs, and the cap H may be removed for access to the surplus boxes.

Having described my invention, I claim—

The comb sashes E, suspended by their upper arms upon seats $a\ b$ formed within the upper front extension of the frame, and their vertical bars supported by the notched seats M M' on the inner sides of the frame, so as to allow them each to be held in position without fastenings and be removed when desired, as shown and described.

In testimony whereof I have hereunto set my hand this 14th day of October, A. D. 1871, in the presence of two subscribing witnesses.

AARON F. DICKEY.

Witnesses:
DENNIS MEYERS,
SAML. W. PEARSON.